Sept. 17, 1935.  R. NOTVEST  2,014,813
ARC WELDING MACHINE
Filed Dec. 9, 1933
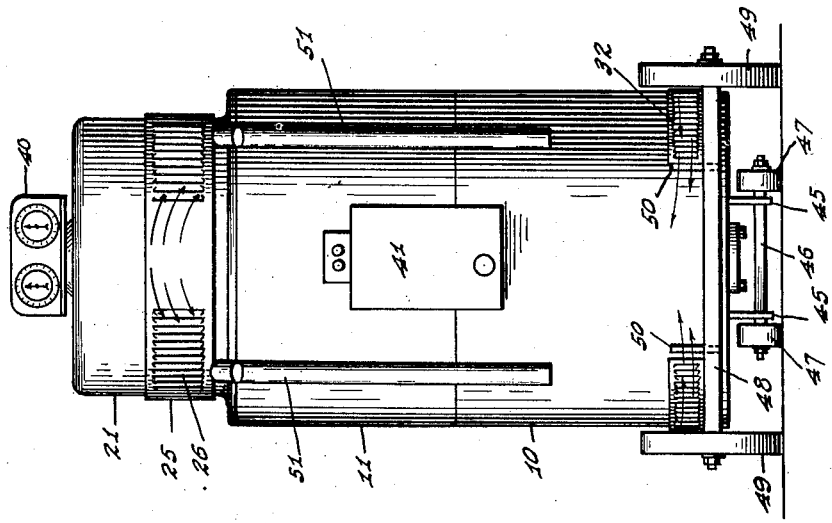
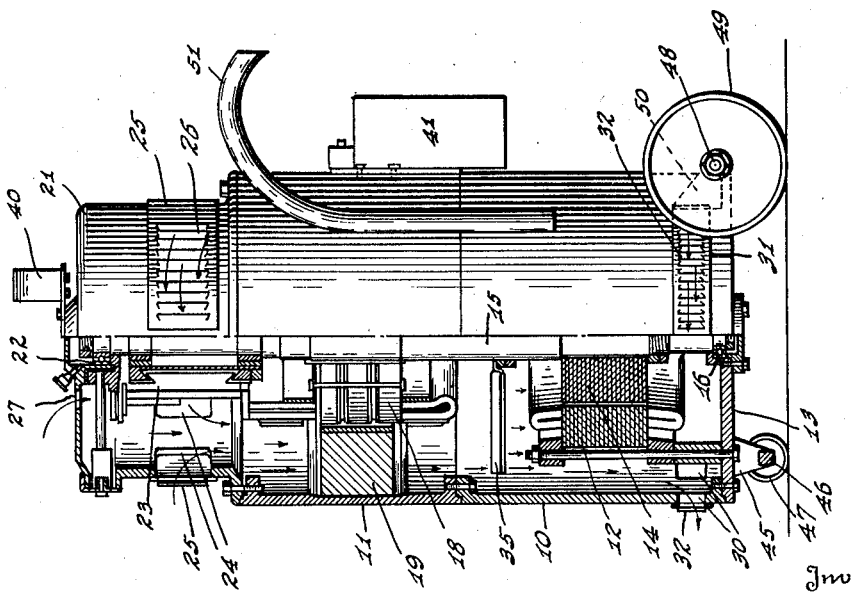
Inventor
ROBERT NOTVEST,
By
Attorneys Patented Sept. 17, 1935

2,014,813

UNITED STATES PATENT OFFICE 2,014,813

ARC-WELDING MACHINE

Robert Notvest, Indianapolis, Ind., assignor to J. D. Adams Manufacturing Company, Indianapolis, Ind., a corporation of Indiana Application December 9, 1933, Serial No. 701,645

1 Claim. (Cl. 171—123)

In electric-arc welding it is customary to convert the usually available 60-cycle alternating current to direct current in order to obtain an arc having the necessary stability. This conversion is effected by the use of rotary converters provided with suitable regulating apparatus for controlling the direct-current produced.

In many situations it is advisable to mount a rotary converter intended for use in arc welding upon a mobile truck in order that it can be readily moved to situations where it is needed. Such converters, mounted upon trucks and provided with the necessary current-regulation apparatus, have become known as arc-welding machines.

Because of current requirements, the parts of a welding machine are relatively heavy, and in order to support the rotating parts of the machine for rotation upon a horizontal axis, as has been the universal practice, the shaft upon which such rotating parts are mounted must be of large diameter in order to possess the necessary strength and rigidity to prevent deflection. Welding machines are customarily used in factories where dirt and dust abound; and this fact, coupled with the vibration which inevitably occurs as the result of the deflection of the horizontal shaft of the machine, contributes greatly to bearing wear and commutator wear. The problem of preventing access of dust to the wearing surfaces is exceptionally serious where the dust includes iron particles, which are attracted toward the machine as the result of magnetism.

It is the object of my invention to produce a welding machine which will overcome some of the disadvantages of prior machines of which I am aware. More specifically, it is my object to produce a welding machine which will be more free from vibration than old machines, and one in which wear resulting from the presence of dirt and dust will be materially decreased.

In carrying out my invention, I depart from standard practice and mount the elements of the motor-generator set which constitutes the welding machine in superposed relation and concentric with respect to a vertical axis. The shaft which carries the rotating elements of the motor and generator is supported in its vertical position by means of an anti-friction thrust bearing. For the machine I provide an enclosing casing having a series of air admission openings at its top and a series of air discharge openings near its bottom, means such as a fan being provided within the casing for circulating air therethrough.

The accompanying drawing illustrates my invention: Fig. 1 is a side elevation of my improved welding machine in partial section; and Fig. 2 is a front elevation of the machine.

The machine illustrated in the drawing comprises a hollow vertical cylindrical casing, conveniently formed of two superposed portions 10 and 11, which may be of equal diameter and secured together by any suitable means.

Within the lower casing-portion 10 I mount the motor, the stator 12 of which is conveniently supported from a bottom plate 13 which closes the lower end of the casing-portion 12. The rotor 14 of the motor is mounted upon a centrally disposed vertical shaft 15 which, at its lower end, is rotatably supported from the bottom plate 13 through an anti-friction thrust bearing 16. This bearing is conveniently a deep-race ball bearing.

The shaft 15 extends upwardly into and through the casing portion 11, and within the limits of such casing portion has mounted upon it the rotating element 18 of the generator. The field or stationary element 19 of the generator is supported in proper axial position directly from the wall of the casing-portion 11.

On the upper end of the casing-portion 11 I provide a head 21 into which the shaft 15 extends. The upper end of the shaft may be rotatably supported from the head 21 by means of an anti-friction bearing 22.

Within the head 21, there is mounted upon the shaft 15 the usual commutator 23. The head 21 also contains the usual brush and brush-adjusting mechanism by means of which the output voltage is regulated. These last mentioned elements are not illustrated in the drawing, as they are well known.

In the side wall of the head 21 I provide a series of openings 24 through which air may enter the casing of the machine. Conveniently, these openings are covered by a sheet-metal band 25 having an annular series of louvers 26 over the openings 24. If desired, the end wall of the head 21 may be provided with one or more air admission openings 27.

Near the lower end of the casing-portion 10 I provide a series of air-discharge openings 30. Like the openings 24, the openings 30 may be covered by an enclosing band 31 of sheet-metal having louvers 32.

Within the casing, and conveniently between the driving and driven elements of the converter, I mount on the shaft 15 a fan 35 by means of which cooling air is drawn in through the louvers 26 and openings 24, passed downwardly through the casing, and discharged through the louvers 32 at the bottom thereof.

The necessary meters with which a welding machine is provided may be mounted upon the upper end wall of the head 21, as indicated at 40, while a control box 41 containing the electrical control apparatus may be mounted on the side of the casing.

In order to provide for mobility of the welding machine, it may be wheel-supported. As shown in the drawing, the bottom plate 13 of the casing is provided with two depending ears 45 near the back of the machine, such ears serving to support an axle 46 upon which wheels 47 are mounted. A second axle 48 carrying wheels 49 is mounted at the opposite side of the machine as through the medium of ears 50 projecting outwardly from the lower casing-section 10. Handles 51 secured to the casing permit the machine to be tilted about the axis of the larger wheels 49 to raise the smaller wheels 47 from the floor, and the machine may then be moved to any desired location.

Depending upon the character of current desired for the welding arc, the driven element of the converter may be either a D. C. generator or an A. C. generator providing a frequency different from that available for driving the machine. Of course, if the driven element is an alternator, slip rings will be substituted for the commutator 23, but such slip-rings will be located at the upper end of the machine within the head 21.

It is to be noted that the air drawn into and passed through the casing is admitted at a considerable distance above the floor level and will therefore be relatively free from dirt and dust. Any iron particles attracted upwardly from the floor toward the machine by magnetism are prevented from entering by the air-stream emerging at the bottom of the machine. It is to be noted further that the commutator (or the slip rings) is also disposed near the top of the machine. This is of great importance, because the presence of dust and dirt in contact with the commutator or slip rings would tend to promote rapid wear. The presence of dust or dirt in the lower part of the casing is not so objectionable, for the motor may be of the induction type and therefore free of slip rings.

The vertical-axis mounting of the rotating elements of the motor and generator have a particular advantage when the converter constitutes a welding machine, which undergoes an abrupt transition from no-load to full-load operation when an arc is struck. The resultant severe force-reactions within the machine, which are in planes transverse to the shaft, are transmitted between the rotating and stationary elements more satisfactorily than if the entire weight of the rotating elements appeared as a radial load on the bearings.

I claim as my invention:

In a welding machine, a vertical hollow cylindrical casing, a central vertical shaft rotatably supported within said casing, an electric motor in the lower portion of said casing, a generator in the upper portion of said casing, said motor and generator including rotary elements mounted on said shaft for rotation therewith, said casing being provided above said generator with air-inlet openings and below said motor with air-discharge openings, a fan mounted on said shaft for forcing air downwardly through said casing, said motor being smaller in diameter than said casing to provide an annular air passage, and wheels upon which said casing is mounted.

ROBERT NOTVEST.